(12) United States Patent
Grimaldi

(10) Patent No.: US 7,788,640 B2
(45) Date of Patent: Aug. 31, 2010

(54) USING CODE ANALYSIS TO GENERATE DOCUMENTATION

(75) Inventor: Sean Grimaldi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/023,720

(22) Filed: Dec. 28, 2004

(65) Prior Publication Data

US 2006/0143594 A1 Jun. 29, 2006

(51) Int. Cl.
G06F 9/44 (2006.01)
G06F 9/45 (2006.01)
(52) U.S. Cl. .................. 717/123; 717/120; 717/141
(58) Field of Classification Search ......... 717/120–123, 717/141–143
See application file for complete search history.

(56) References Cited

U.S. PATENT DOCUMENTS

| | | | | |
|---|---|---|---|---|
| 4,860,203 A * | 8/1989 | Corrigan et al. | ............. | 717/123 |
| 5,038,316 A * | 8/1991 | Hempleman et al. | ........ | 715/205 |
| 5,185,867 A * | 2/1993 | Ito | ............. | 717/143 |
| 5,408,667 A * | 4/1995 | Brodie et al. | ............. | 717/106 |
| 5,452,206 A * | 9/1995 | Turrietta et al. | ............. | 715/531 |
| 5,513,305 A * | 4/1996 | Maghbouleh | ............. | 715/234 |
| 5,524,192 A * | 6/1996 | Dauerer et al. | ............. | 715/234 |
| 5,560,009 A * | 9/1996 | Lenkov et al. | ............. | 717/124 |
| 5,875,334 A * | 2/1999 | Chow et al. | ............. | 717/141 |
| 5,987,251 A * | 11/1999 | Crockett et al. | ............. | 717/115 |
| 6,212,677 B1 * | 4/2001 | Ohkubo et al. | ............. | 717/143 |
| 6,257,774 B1 * | 7/2001 | Stack | ............. | 717/110 |
| 6,336,217 B1 * | 1/2002 | D'Anjou et al. | ............. | 717/121 |
| 6,389,481 B1 * | 5/2002 | Malcolm | ............. | 719/310 |
| 6,467,080 B1 * | 10/2002 | Devine et al. | ............. | 717/123 |
| 6,671,871 B2 * | 12/2003 | Utsumi | ............. | 717/101 |
| 6,675,370 B1 * | 1/2004 | Sundaresan | ............. | 717/106 |
| 6,951,010 B2 * | 9/2005 | Sasaki | ............. | 717/123 |
| 7,076,534 B1 * | 7/2006 | Cleron et al. | ............. | 709/219 |
| 7,114,149 B2 * | 9/2006 | Aptus et al. | ............. | 717/123 |
| 7,155,664 B1 * | 12/2006 | Lee et al. | ............. | 715/502 |
| 7,188,336 B2 * | 3/2007 | Humphries | ............. | 717/123 |
| 7,340,726 B1 * | 3/2008 | Chelf et al. | ............. | 717/126 |
| 7,458,063 B2 * | 11/2008 | Pandit | ............. | 717/123 |
| 7,536,684 B2 * | 5/2009 | Patrizio et al. | ............. | 717/170 |
| 7,568,184 B1 * | 7/2009 | Roth | ............. | 717/123 |
| 2002/0174010 A1 * | 11/2002 | Rice, III | ............. | 705/14 |
| 2003/0037312 A1 * | 2/2003 | Czech | ............. | 717/120 |
| 2004/0078786 A1 * | 4/2004 | Hoolahan et al. | ............. | 717/136 |

(Continued)

OTHER PUBLICATIONS

Perlman, "Multilingual Programming: Coordinating Programs, User Interfaces, On-Line Help and Documentation," 1986, ACM, p. 123-129.*

(Continued)

*Primary Examiner*—Wei Y Zhen
*Assistant Examiner*—Qing Chen
(74) *Attorney, Agent, or Firm*—Workman Nydegger

(57) ABSTRACT

The subject invention relates to systems and methods that generate documentation discovered by programmatic and/or automatic code analysis. The generated documentation can be related to, for example, security, error conditions, permissions, exceptions, etc. Static code analysis and/or runtime analysis can be utilized to provide more complete, updated and/or accurate documentation as compared to conventional techniques by obtaining information, which can be utilized to automatically generate the documentation. According to an aspect of the subject invention, documentation can be generated that can supplement existing documentation.

26 Claims, 12 Drawing Sheets

U.S. PATENT DOCUMENTS

2005/0060688 A1* 3/2005 Kamalakantha ............. 717/123
2005/0216891 A1* 9/2005 Sundararajan et al. ...... 717/123

OTHER PUBLICATIONS

Schilling et al., "Evolution of Program Documentation Through a Long-Term Project," 1986, ACM, p. 34-43.*

Buxton et al., "Codedocs: Executable Documents for Documenters: The end of the passive user guide," 1992, ACM, p. 115-119.*

McKeown et al., "Practical Issues in Automatic Documentation Generation," 1994, Morgan Kaufmann Publishers Inc., p. 7-14.*

The Authoritative Dictionary of IEEE Standards Terms, 2000, IEEE, p. 346 and 1103.*

* cited by examiner

USING CODE ANALYSIS TO GENERATE DOCUMENTATION

TECHNICAL FIELD

The subject invention generally relates to generating documentation, and more particularly to systems and methods that utilize static code analysis and/or runtime analysis to generate documentation.

BACKGROUND OF THE INVENTION

In computer related industries, software tends to be rapidly evolving. Oftentimes, it is beneficial and/or necessary to provide documentation that describes certain aspects of software to enable a user to utilize the software. Documentation can be any communicable material (e.g., text, video, audio, . . . ) employed to explain various attributes of an object, a system or a procedure. According to an example, documentation can be presented to a user as printed books or computer readable files (e.g., HTML pages). The documentation, for instance, can describe the operation of a system by providing examples, parameters, descriptions of outputs, exceptions, requirements, security parameters, syntax, semantics, error codes, ranges, etc.

Traditionally, technical writers review source code and specifications and generate documentation based upon their evaluations. Commonly there is a limited amount of time between the completion of software and its release to customers during which the technical writers document the software. Moreover, some software can include many millions of lines of source code to be documented. Due to time and/or resource constraints, technical writers frequently fail to document software well and regularly omit critical aspects such as security and error handling. Additionally, technical writers oftentimes publish inaccurate and/or misleading information because the code has changed subsequent to their evaluation. Also, technical writers may be unable or limited in their ability to create documentation under certain circumstances, such as if they lack access to the source code and instead inspect object code, binary instruction sets, etc.

Conventional techniques utilized to generate documentation typically require a programmer or developer to include an indicator or description (e.g., English (or any other suitable language) description explaining aspects of the code populated by the user, . . . ) with the programmed code related to the developed software; additionally, the indicators or descriptions can be output and utilized as the documentation. Accordingly, these conventional generation techniques present deficiencies similar to those yielded by technical writers since the indicators or descriptions may fail to be included with the programmed code and/or may not be updated to account for subsequent alterations of the code because the programmers or developers provide the content of the indicators or descriptions.

Additionally, software programmers can be affected by the aforementioned deficiencies associated with the documentation. For instance, programmers writing secure code typically need to know the permissions associated with a called method. Generally, this information is not available in software application programming interface (API) documentation. Additionally, if this information is available, it can be outdated and, therefore, inaccurate. By way of illustration, a programmer can produce code that writes to a log file. If a log file does not currently exist, the code can provide for the creation of a new log file, which can require proper permissions. If the documentation is incomplete and/or inaccurate regarding these permissions and the programmer is not familiar with the required permissions, then the programmer's code can fail. Moreover, incomplete and/or inaccurate documentation, for example, can lead to development of code that can be maliciously exploited by a hacker who takes advantage of the improper utilization of permissions associated with the creation of the log file and/or the failure to create a log file. Incomplete and/or inaccurate information presented in the documentation can yield several negative repercussions such as undermining customer trust, slowing adoption of new software, and reducing the security associated with software. In view of the above, there is a need to improve documentation generation.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and methods that generate documentation discovered by programmatic and/or automatic code analysis. The generated documentation can be related to, for example, security, error conditions, permissions, exceptions, etc. Static code analysis and/or runtime analysis can be utilized to provide more complete, updated and/or accurate documentation as compared to conventional techniques by obtaining information, which can be utilized to automatically generate the documentation. According to an aspect of the subject invention, documentation can be generated that can supplement existing documentation. Also, pursuant to an exemplary illustration, the documentation generated by the subject invention can be edited and/or accepted by a user, program, etc. to create documentation for an end user.

According to an aspect of the subject invention, a system that generates documentation is provided. The system can include an input component that receives existing documentation and at least one of source code, object code, and a binary instruction set. Additionally, the system can include a documentation generator that utilizes at least one of static code analysis and runtime analysis to evaluate the at least one of source code, object code, and the binary instruction set to automatically generate supplemental documentation.

Pursuant to another aspect of the subject invention, a method is provided that facilitates generating documentation. The method can include receiving at least one of source code, object code, and a binary instruction set, evaluating the at least one of source code, object code, and binary instruction set utilizing at least one of static code analysis and runtime analysis, and generating documentation based on the evaluation.

According to another aspect of the subject invention, a system that facilitates generating documentation is provided. The system can include means for analyzing at least one of source code, object code, and a binary instruction set to derive information related to the at least one of source code, object code, and binary instruction set. Also, the system can include means for generating documentation that comprises the derived information.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
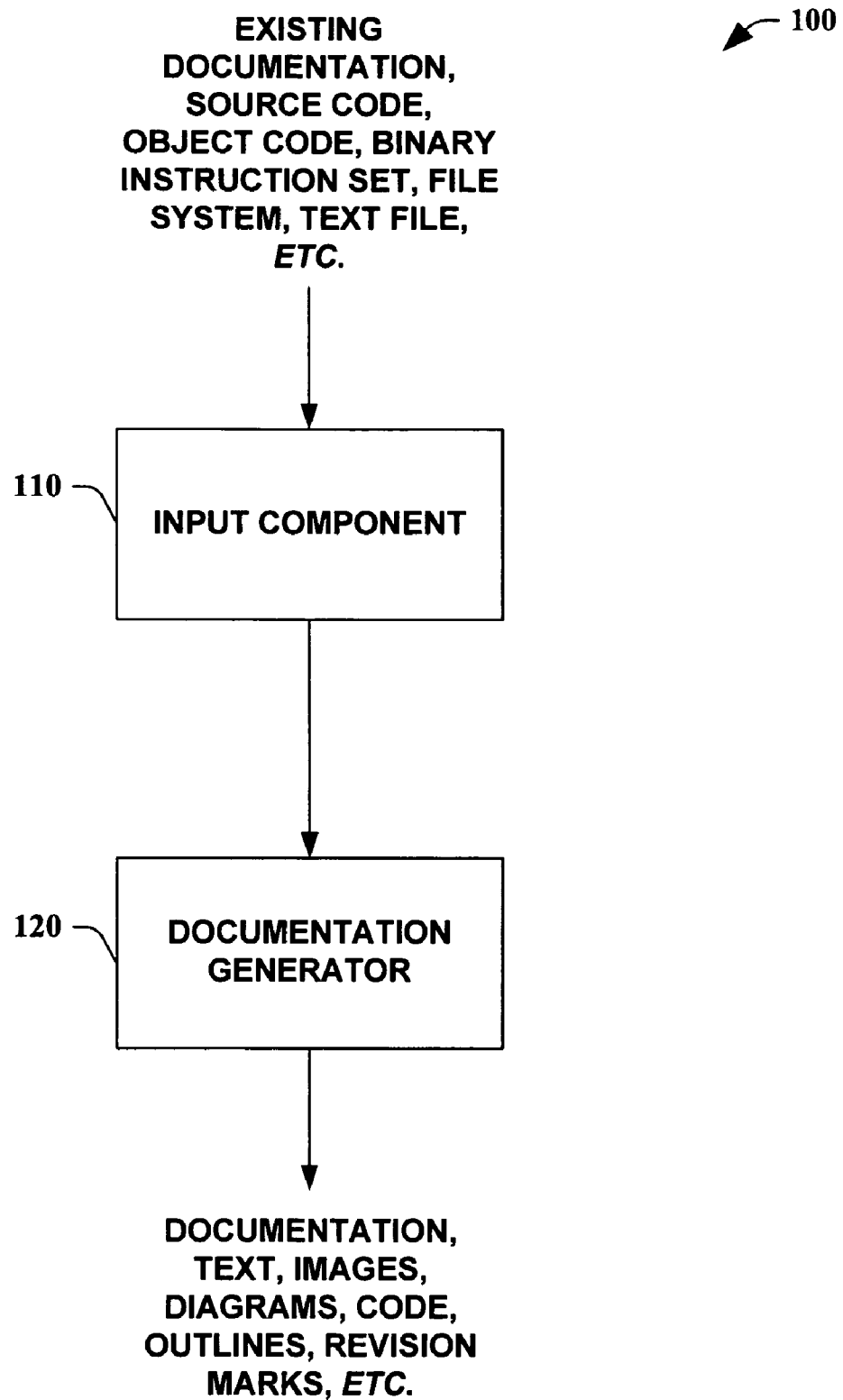
FIG. 1 illustrates a block diagram of an exemplary system that generates documentation in accordance with an aspect of the subject invention.

The subject invention relates to systems and methods that generate documentation discovered by programmatic and/or automatic code analysis. The generated documentation can be associated with, for example, security, error conditions, permissions, exceptions, etc. The subject invention can evaluate source code, object code, binary instruction sets, file systems, etc., or a combination thereof, utilizing static code analysis and/or runtime analysis to produce the documentation. Additionally, the generated documentation, for instance, can be employed to supplement existing documentation (e.g., documentation created by technical writers, conventional techniques, the subject invention at a previous time, . . . ); accordingly, the generated documentation can be automatically incorporated with existing documentation (e.g., supplemental documentation), included as revision marks (e.g., approvable documentation) that a user can integrate into the documentation, etc. Additionally or alternatively, the generated documentation can be presented as the documentation without further action.

As used in this application, the terms "component," "system," "environment," "generator," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates a system 100 that generates documentation in accordance with an aspect of the subject invention. The system 100 includes an input component 110 that obtains an input such as, for example, source code, object code, a binary instruction set, existing documentation, a file system, etc., and/or a combination thereof. Additionally or alternatively, the input component 110 can receive a portion of the input (e.g., portion of the source code, . . . ) and/or a path to the input. Moreover, the input component 110 can automatically receive the input, obtain the input in response to a user action (e.g., initiating an application, selecting an operation, pressing a button, . . . ), search for the input, etc. The input obtained by the input component 110 can be obtained from a local source, remote source, etc. The input component 110 can be, for example, software, hardware, firmware, etc. or a combination thereof.

The system 100 further comprises a documentation generator 120, which receives the input from the input component 110. The documentation generator 120 analyzes the input and generates documentation associated with the input. According to an example, the documentation generator 120 can employ static code analysis, runtime analysis, programmatic analysis, automatic code analysis, etc. to create an output such as documentation, text, images, diagrams, code, outlines, revision marks (e.g., approvable documentation), etc. The documentation generator 120 can derive information from the input other than information populated by a user (e.g., programmer, developer); thus, the documentation generator 120 can produce documentation that includes information other than, for example, comments written in the source code in English that describe a particular call. The documentation generator 120 can provide any portion of the documentation. For example, the documentation generator 120 can supplement documentation created by another source such that a majority of the documentation is created by a programmer, technical writer, conventional generation technique (e.g., C# documentation comments, JAVADOC™ comments, . . . ), etc., while the documentation generator 120 provides a portion of the documentation (e.g., supplemental documentation) related to various aspects such as security, error handling, etc. Pursuant to an exemplary aspect, the documentation generator 120 can be utilized in connection with essentially any programming language (e.g., C#, C++, JAVA™ programming language, . . . ) and any feature associated with the programming languages.

The documentation generator 120 can produce various forms of output. For example, the documentation generator 120 can yield an output that is in a form that is presentable to a user. By way of illustration, the documentation generator 120 can create one or more of a text document, video, audio, an image, a diagram, a graph, a chart, etc., which is automatically populated with the documentation information, which can be provided to a user. According to another example, the documentation generator 120 can provide information that is incorporated into existing documentation as revision marks (e.g., approvable documentation); thus, a writer, programmer, etc. can inspect the revision marks and choose whether to incorporate such changes. By way of a further example, the documentation generator 120 can automatically integrate the gathered information into a preexisting documentation set.

The subject invention provides advantages compared to conventional documentation generation systems and/or methods. In particular, the subject invention provides more complete and/or accurate documentation to a user. The documentation can be updated so that it corresponds to a current version of the code; thus, the amount of misleading information included within the documentation can be decreased. Additionally, the subject invention provides a cost effective manner of remaining up-to-date with development of software and improving the accuracy of documentation. Furthermore, resources associated with documenting can be reduced because fewer technical writers are required. Also, the documentation can be generated faster, which can be important, for example, when providing instructions associated with alpha and beta releases of software.

Figure 2:
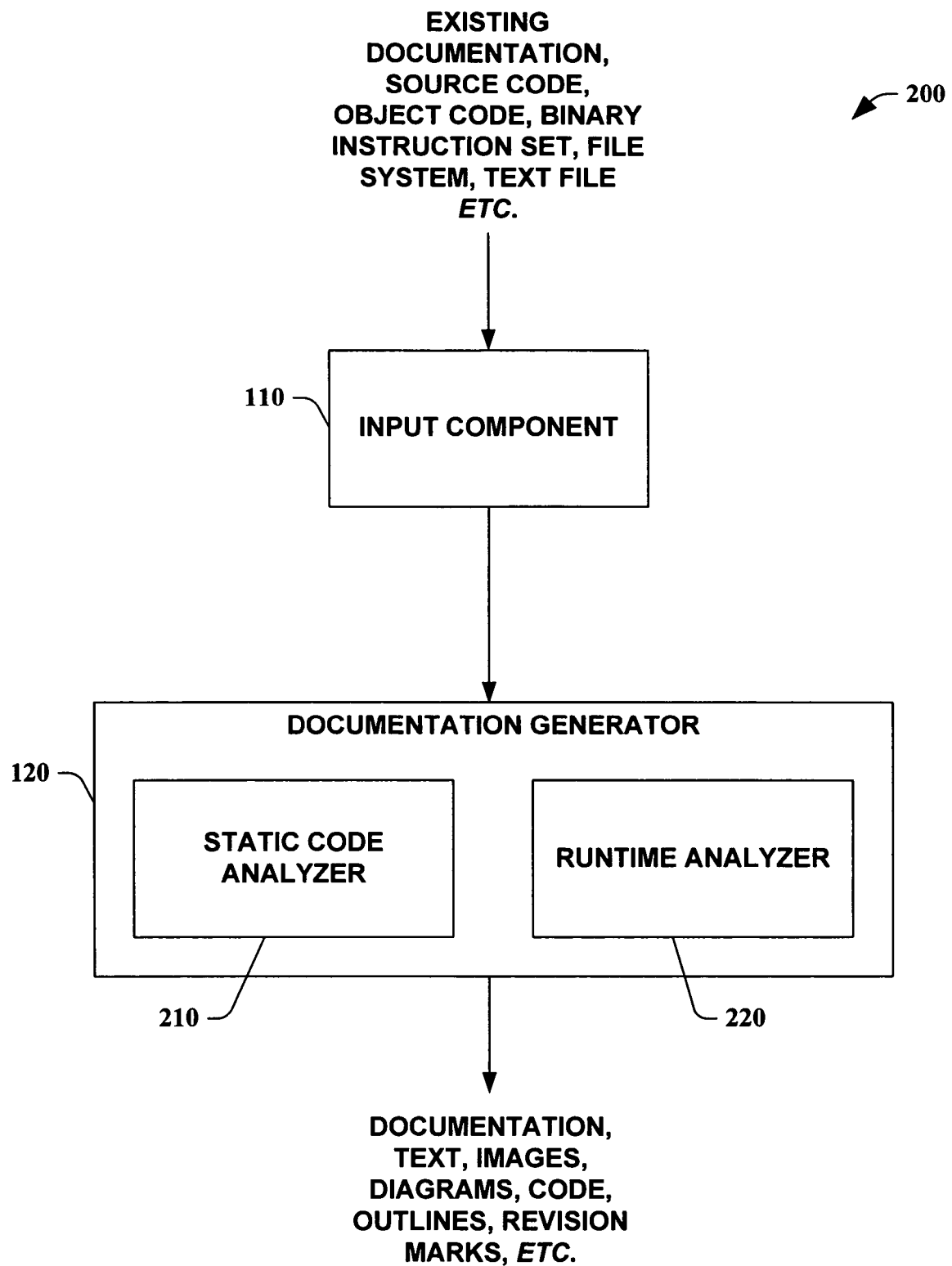
FIG. 2 illustrates a block diagram of an exemplary system that generates documentation in accordance with an aspect of the subject invention.

With reference to FIG. 2, illustrated is a system 200 that generates documentation according to an aspect of the subject invention. The system 200 comprises the input component 110 that receives an input such as, for example, existing documentation, source code, object code, a binary instruction set, a text file, and/or a file system. The system 200 also includes the documentation generator 120, which further comprises a pre-runtime analyzer 210 and a runtime analyzer 220. The pre-runtime analyzer 210 and/or the runtime analyzer 220 can be utilized to evaluate the input(s) obtained via the input component 110 and to generate documentation associated with the input(s).

The pre-runtime analyzer 210 generates documentation based on the input prior to runtime. For instance, the pre-runtime analyzer 210 can operate at compile time, debugging, development, etc. The pre-runtime analyzer 210 can be, for example, a static code analyzer that evaluates source code. By way of illustration, the static code analyzer can identify sections of the source code that are related to certain operations, calls, methods, etc. (e.g., associated with security, error handling, . . . ). Thereafter, the pre-runtime analyzer 210 and/or the documentation generator 120 produce documentation related to the identified sections of the source code. According to an example, when permissions associated with source code are evaluated, the pre-runtime analyzer 210 (e.g., static code analyzer) can identify essentially all calls to create files within the source code (e.g., by searching the source code), since the permissions associated with the creation of a file need to be properly handled to ensure that an application does not fail. The pre-runtime analyzer 210 can provide a report to a user (e.g., technical writer) identifying the calls utilized in the source code, thereby enabling the user to modify the documentation accordingly. Alternatively or additionally, the pre-runtime analyzer 210 can output text (e.g., boilerplate text) that indicates that the code requires file access permission, for example, to a particular directory, path, etc., which can be incorporated with existing documentation. Thus, the documentation can be modified when variations are made to the source code. Also, static code analysis can be utilized, for instance, to evaluate the flow of control statements (e.g., "if", "switch") and output an outline of the control of flow in a program.

Pursuant to an example, the pre-runtime analyzer 210 (e.g., static code analyzer) can generate documentation based on attributes, which can be utilized with most programming languages (e.g., C#, C++, JAVA™ gramming language, . . . ). The attributes can explicitly declare that the code requires permission to access, read, write, etc. to a path, directory, etc. Thus, the pre-runtime analyzer 210 can generate an output (e.g., documentation) that corresponds to the attributes.

The following pseudocode illustrates an example of source code that incorporates attributes, which can be evaluated with the pre-runtime analyzer 210. For example, access can be controlled to resources and members by placing a security attribute at method, class or assembly level in C#, which is part of a feature referred to as Declarative Code Access Security. In regards to throwing exceptions, some languages such as Java include facilities for discovering thrown exceptions; however, these languages are uncommon, and thus, the pre-runtime analyzer 210 can be utilized to evaluate the exceptions.

```
[FileIOPermissionAttribute(SecurityAction.RequestRefuse,
"c:\MyDirectory")]
Public void Foo(Bar)
{
    //...implementation...
    If(x==y)
        throw new FileNotFoundException( );
}
```

The runtime analyzer 220 generates documentation at runtime, for example, by utilizing a binary instruction set, file system, object code, etc., or a combination thereof. Thus, the runtime analyzer 220 can be employed when source code is not available. The runtime analyzer 220 inspects the file system while executing the binary instruction set and/or object code to determine whether the binary instruction set and/or object code attempt to utilize the file system. Therefore, the runtime analyzer 220 identifies whether the file system is manipulated. According to an example, the runtime analyzer 220 can evaluate whether there is right access to create a file and what occurs if "create file" permissions are not given. Also, the runtime analyzer 220, for instance, can determine when the binary instruction set and/or object code attempt to create a new file (e.g., upon pressing a button, at initialization, upon occurrence of an error, . . . ). Upon exploring the impact of the binary instruction set and/or the object code on the file system, the runtime analyzer 220 can output corresponding documentation.

Figure 3:
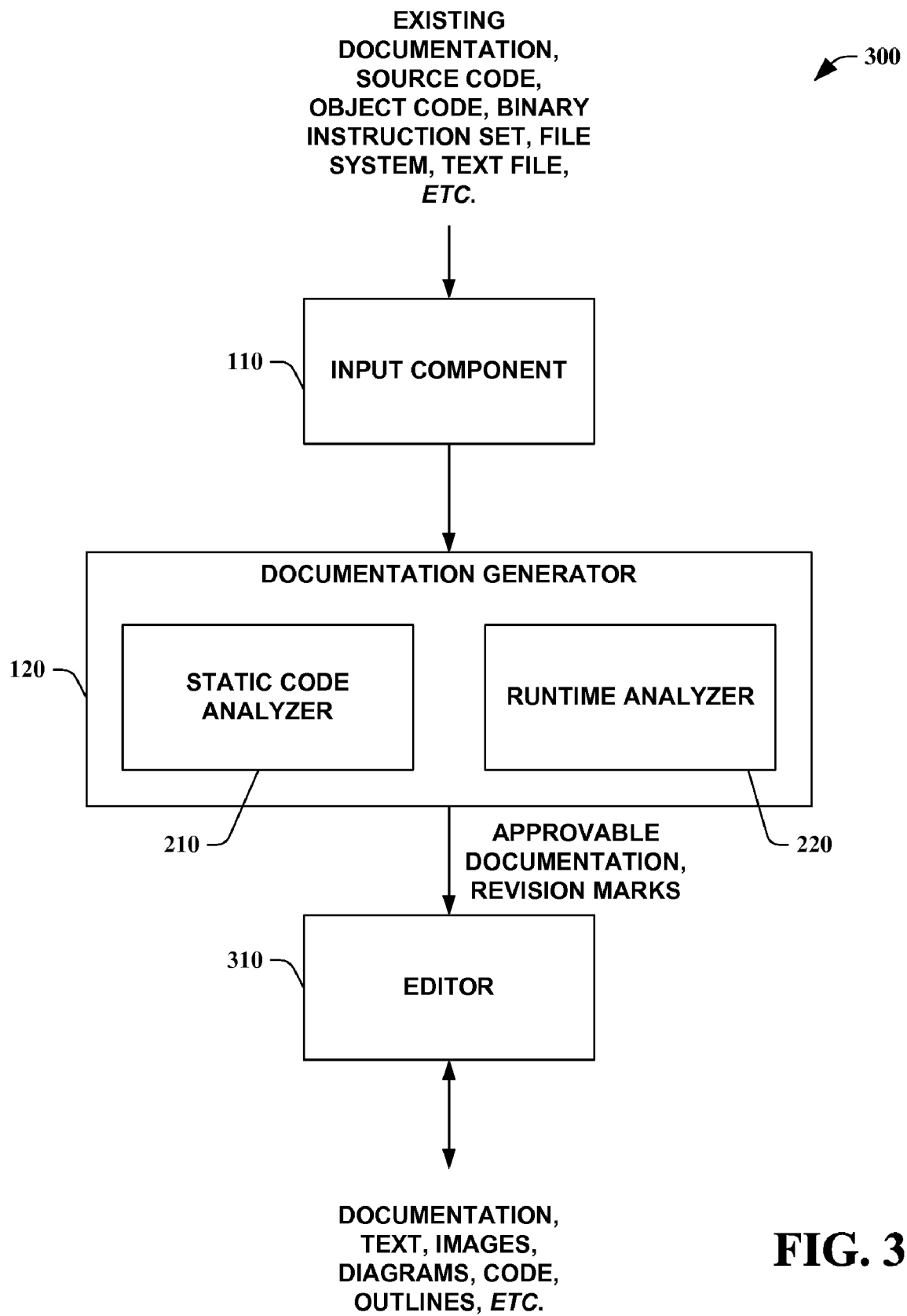
FIG. 3 illustrates a block diagram of an exemplary system that facilitates generating documentation in accordance with an aspect of the subject invention.

FIG. 3 illustrates a system 300 that facilitates generating documentation according to an aspect of the subject invention. The system 300 includes the input component 110, which can obtain, request, receive, etc. input(s) such as existing documentation, source code, object code, a binary instruction set, a text file, a file system, etc. The input is provided by the input component 110 to the documentation generator 120, which further comprises the pre-runtime analyzer 210 (e.g., static code analyzer) and the runtime analyzer 220. The documentation generator 120 evaluates the input(s) and yields approvable documentation, which can be text, images, diagrams, charts, code, outlines, etc., that requires acceptance and/or verification prior to being adopted as the generated documentation or integrated into existing documentation.

The system 300 further comprises an editor 310 that obtains the approvable documentation. The editor 310 is utilized to accept, alter, and/or format the approvable documentation. The editor 310, for example, can be a text editor, a source code editor, an HTML editor, a graphics editor, a sound editor, a video editor, etc. The editor 310 can be a separate component from the documentation generator 120 (as depicted) and/or the documentation generator 120 can comprise the editor 310. By way of example, the documentation generator 120 can evaluate source code and provide approvable documentation such as revision marks in a text document. Thus, a programmer and/or technical writer can utilize the editor 310 to review and decide whether to accept the revision marks. If the revision marks are determined to be acceptable, the editor 310 can output the documentation. However, the programmer and/or technical writer can alternatively determine that the revision marks are incorrect, inaccurate, misleading, or require additional content; thus, the editor 310 can be employed to facilitate altering the revision marks to place the documentation in a finished form. Additionally or alternatively, the editor 310 can automatically accept, alter, and/or format the approvable documentation with minimal user interaction.

Figure 4:
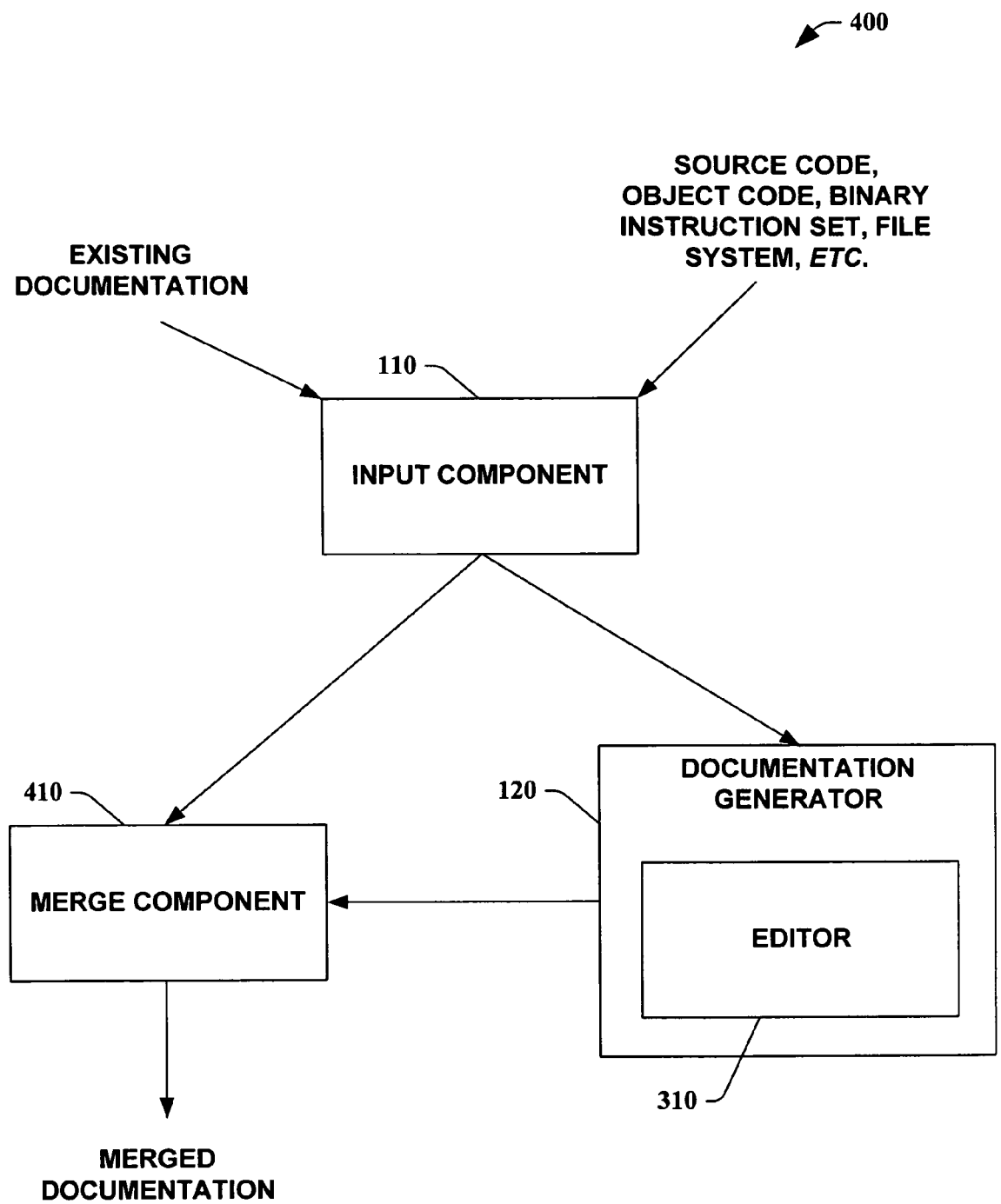
FIG. 4 illustrates a block diagram of an exemplary system that supplements existing documentation in accordance with an aspect of the subject invention.

Turning to FIG. 4, illustrated is a system 400 that supplements existing documentation according to an aspect of the subject invention. The system 400 comprises the input component 110, which obtains existing documentation and/or a path to the existing documentation. The existing documentation can be created by any source such as a programmer, technical writer, C# documentation comments, Javadocs, etc. Additionally, it is contemplated that the existing documentation can be any size; for example, the existing documentation can be millions of lines in length. Also, the existing documentation can be in any format such as thousands of Internet pages, a single text document, a video, an audio recording, a chart, a table, etc. The input component 110 additionally obtains information such as source code, object code, a binary instruction set, a file system, etc., a combination thereof, or a path to such information. The input component 110 provides the information to the documentation generator 120, which comprises the editor 310 (and can also include the pre-runtime analyzer 210 and/or the runtime analyzer 220 of FIG. 2). The documentation generator 120 evaluates the information utilizing runtime analysis and/or static code analysis and can employ the editor 310 to create supplemental documentation. The supplemental documentation, for example, can be related to particular aspects associated with software such as error handling and security, which are oftentimes poorly documented.

A merge component 410 receives and integrates the supplemental documentation and the existing documentation to produce merged documentation, which is an updated version of the documentation. According to an example, the merge component 410 can receive a path to a set of existing documentation, such as a few thousand Internet pages, as well as a text document that represents the supplemental documentation created by the documentation generator 120, which is related to security, error handling, etc. The merge component 410 can automatically integrate the text document with the Internet pages to produce the merged documentation that is in sync with a current version of the source code, object code, binary instruction set, etc. For example, the merge component 410 can convert the text document into an Internet page with formatting similar to the existing documentation and/or insert hyperlinks to the newly created page on any number of other pages of the existing documentation. Additionally or alternatively, the merge component 410 can insert and/or replace hyperlinks, tables, charts, diagrams, code, outlines, text, etc. to incorporate the supplemental documentation. According to a further example, the editor 310 can be associated with the merge component 410, thereby enabling a user to alter and/or accept the manner in which the existing documentation and the supplemental documentation are integrated. Thus, a programmer and/or a technical writer can adjust the format, content, organization, etc. of the existing documentation and/or the supplemental documentation to produce a desired merged documentation.

Figure 5:
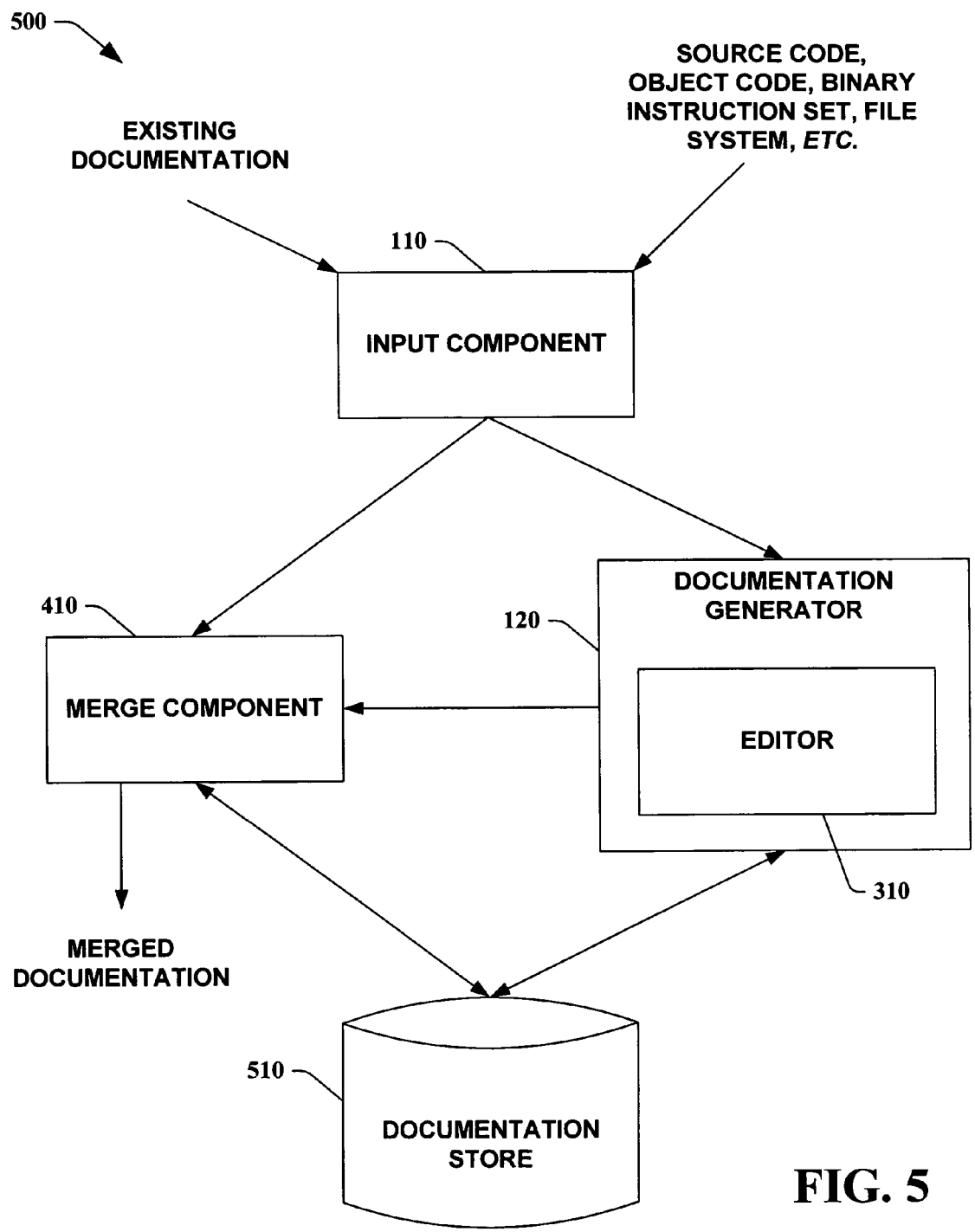
FIG. 5 illustrates a block diagram of an exemplary system that facilitates creating and/or updating documentation in accordance with an aspect of the subject invention.

FIG. 5 illustrates a system 500 that facilitates creating and/or updating documentation in accordance with an aspect of the subject invention. The system 500 comprises the input component 110, the documentation generator 120 that includes the editor 310, and the merge component 410. The system 500 further comprises a documentation store 510, which is coupled to the documentation generator 120 and the merge component 410.

According to an example, the documentation store 510 can be utilized in connection with the documentation generator 120 (e.g., pre-runtime analyzer 210, static code analysis) to facilitate evaluating source code. By way of illustration, the documentation store 510 can maintain a database of signatures that are dependent upon programming language and/or platform. These signatures can represent certain aspects associated with the software (e.g., security, error handling) and can be compared to the source code to identify particular actions, calls, methods, etc., thereby enabling the documentation generator 120 to create the appropriate documentation (e.g., approvable documentation).

Additionally or alternatively, the documentation store 510 can store boilerplate text, graphics, diagrams, charts, video, audio, etc. that can be incorporated into the documentation (e.g., approvable documentation, supplemental documentation, merged documentation, . . . ). For example, when the documentation generator 120 determines that access is required to a particular directory, the documentation store 510 can provide boilerplate text that can be incorporated into the documentation that indicates this requirement. Furthermore, it is to be appreciated that the documentation store 510 can be utilized in the absence of the merge component 410 when the documentation generator 120 produces documentation that does not require integration with existing documentation.

The documentation store 510 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), SYNCHLINK™ DRAM (SLDRAM), and direct RAMBUS™ RAM (DRRAM). The documentation store 510 of the subject systems and methods is intended to comprise, without being limited to, these and any other suitable types of memory. The subject invention contemplates that the documentation store 510 can be part of the documentation generator 120, the editor 310, the merge component 410, a separate component as depicted, or a combination thereof.

Figure 6:
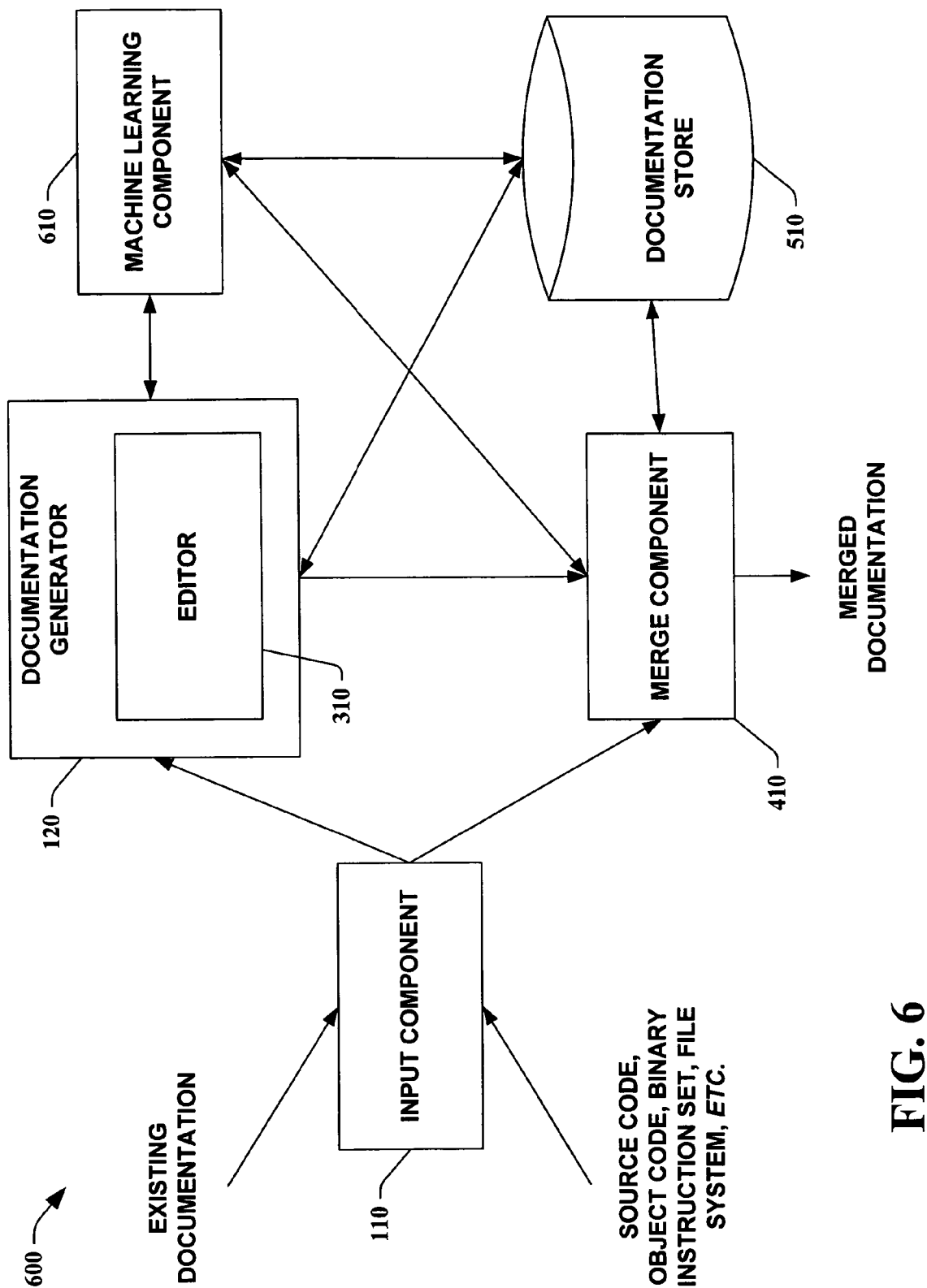
FIG. 6 illustrates a block diagram of an exemplary system that facilitates generating documentation in accordance with an aspect of the subject invention.

FIG. 6 illustrates a system 600 that facilitates generating documentation in accordance with an aspect of the subject invention. The system 600 includes the input component 110 that receives existing documentation as well as source code, object code, binary instruction sets, file systems, etc., a combination or a portion thereof, and/or a path thereto. The system 600 also comprises the documentation generator 120, which includes the editor 310, the merge component 410, and the documentation store 510. The documentation generator 120 (and/or the pre-runtime analyzer 210 of FIG. 2, the runtime analyzer 220 of FIG. 2, ... ), the editor 310, the merge component 410, and/or the documentation store 510 can employ a machine learning component 610 in connection with generating documentation. Machine learning refers to an area of artificial intelligence concerned with development of techniques that allow computers and/or programs to "learn." More particularly, machine learning can relate to methods for creating and/or modifying computer programs based at least in part upon an analysis of data set(s). Thus, the documentation generator 120, the editor 310, the merge component 410 and/or the documentation store 510 can operate more efficiently over time as more contextual data, user history, application history, and the like is collected.

Furthermore, the machine learning component 610 can make inferences relating to determining tasks that can be accomplished and/or executing tasks associated therewith. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, the documentation generator 120, the editor 310, the merge component 410 and/or the documentation store 510, given particular contextual data, can make inferences relating to generating documentation. According to an example, the documentation generator 120 can evaluate source code, object code, a binary instruction set, and/or a file system and infer the appropriate documentation that is associated with particular calls, manipulations, etc. Pursuant to a further illustration, the editor 310 can infer whether to automatically accept all or a portion of the approvable documentation based on previous user action employing the editor 310.

Figure 7:
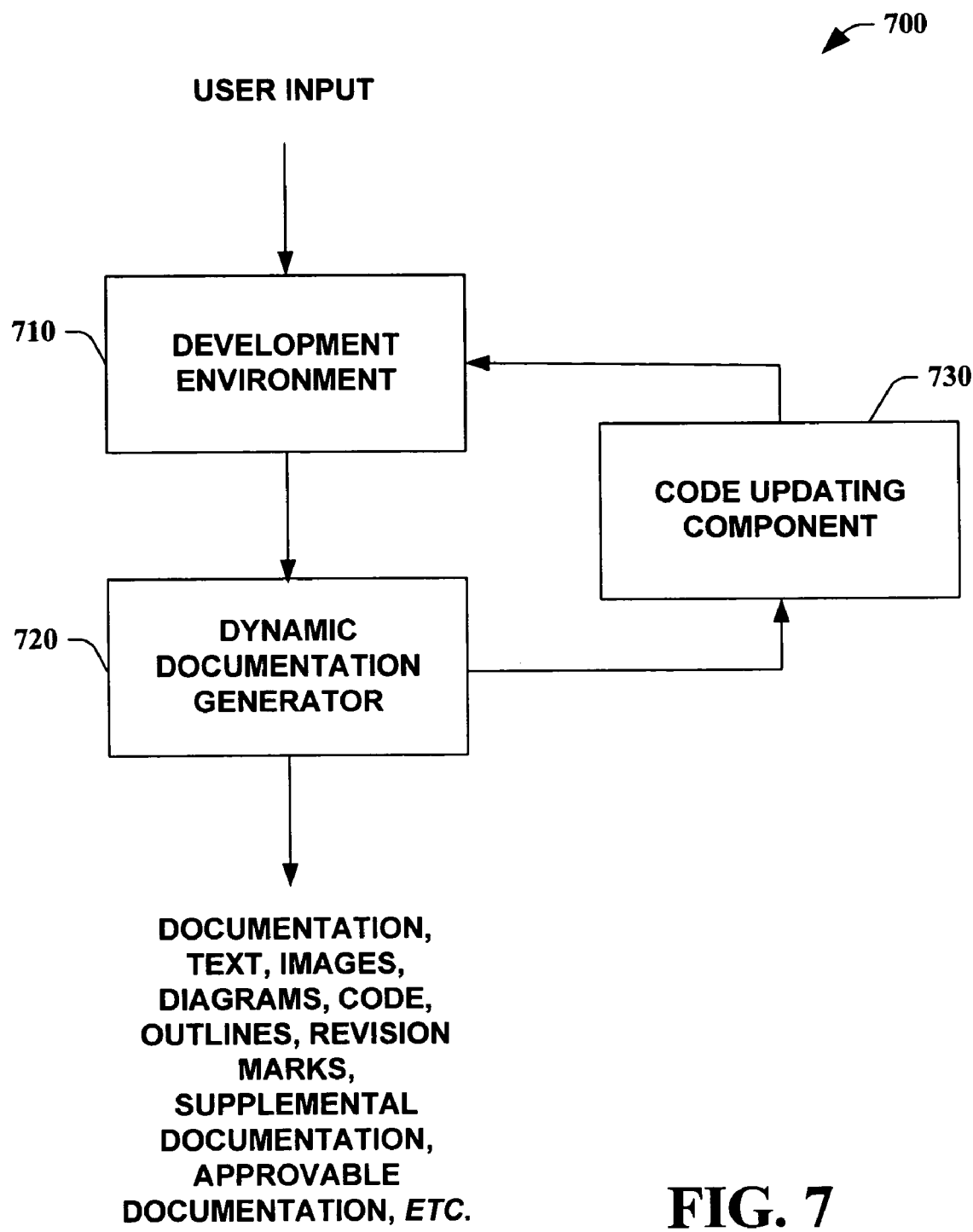
FIG. 7 illustrates a block diagram of an exemplary system that dynamically generates documentation in accordance with an aspect of the subject invention.

FIG. 7 illustrates a system 700 that dynamically generates documentation according to an aspect of the subject invention. The system 700 comprises a development environment 710, which can be utilized by a user to develop software. The user can employ the development environment 710 to create software (e.g., source code, ... ) written in substantially any programming language. During coding, the development environment 710 can provide a current version of the code and/or an indicator to initiate documentation to a dynamic documentation generator 720. According to an example, the development environment 710 can utilize the machine learning component 610 (FIG. 6) to determine when a significant portion of the code is altered and, thus, the indicator can be provided to the dynamic documentation generator 720 in response to initiate updating the documentation. The dynamic documentation generator 720 can analyze the code created by the user and produce a portion or all of the documentation related to the code. The dynamic documentation generator 720 can utilize static code analysis, runtime analysis, etc. to determine various aspects of the code. Additionally, the dynamic documentation generator 720 can output documentation, text, images, diagrams, code, outlines, revision marks, supplemental documentation, etc. based on the determined aspects.

The system 700 further comprises a code updating component 730 that is coupled to the dynamic documentation generator 720. The dynamic documentation generator 720 can identify inconsistency and/or inaccuracy within the code such as, for example, incorrect attributes, etc. Thereafter, the code updating component 730 can alter the code via the development environment 710 to correct such inconsistencies and/or inaccuracies. By way of illustration, since attributes can be classes, a derived class can be inserted by the code updating component 730 to replace an incorrect attribute.

Figure 8:
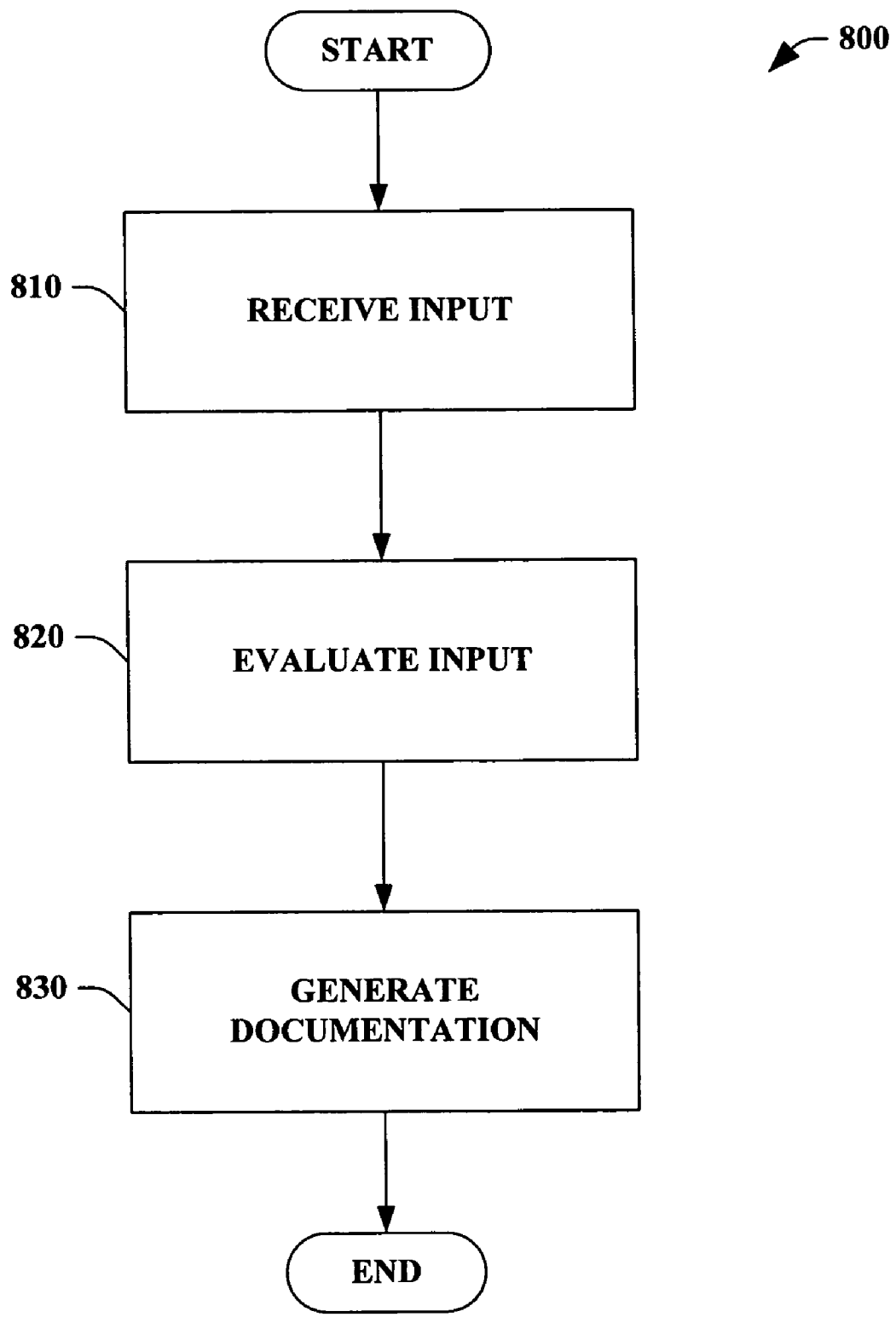
FIG. 8 illustrates a flow chart of an exemplary methodology that facilitates generating documentation in accordance with an aspect of the subject invention.
Figure 9:
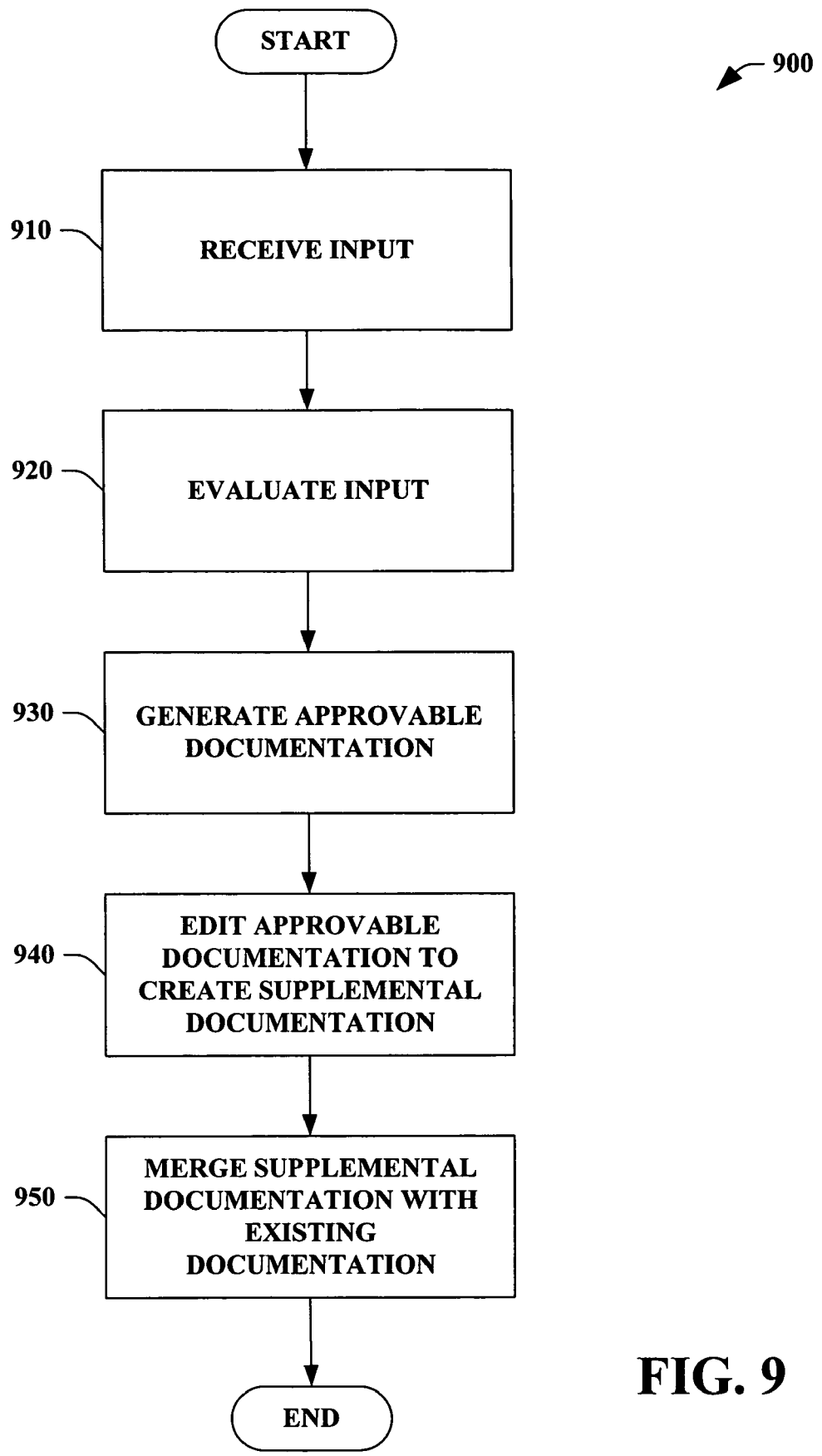
FIG. 9 illustrates a flow chart of an exemplary methodology that facilitates supplementing and/or editing documentation in accordance with an aspect of the subject invention.
Figure 10:
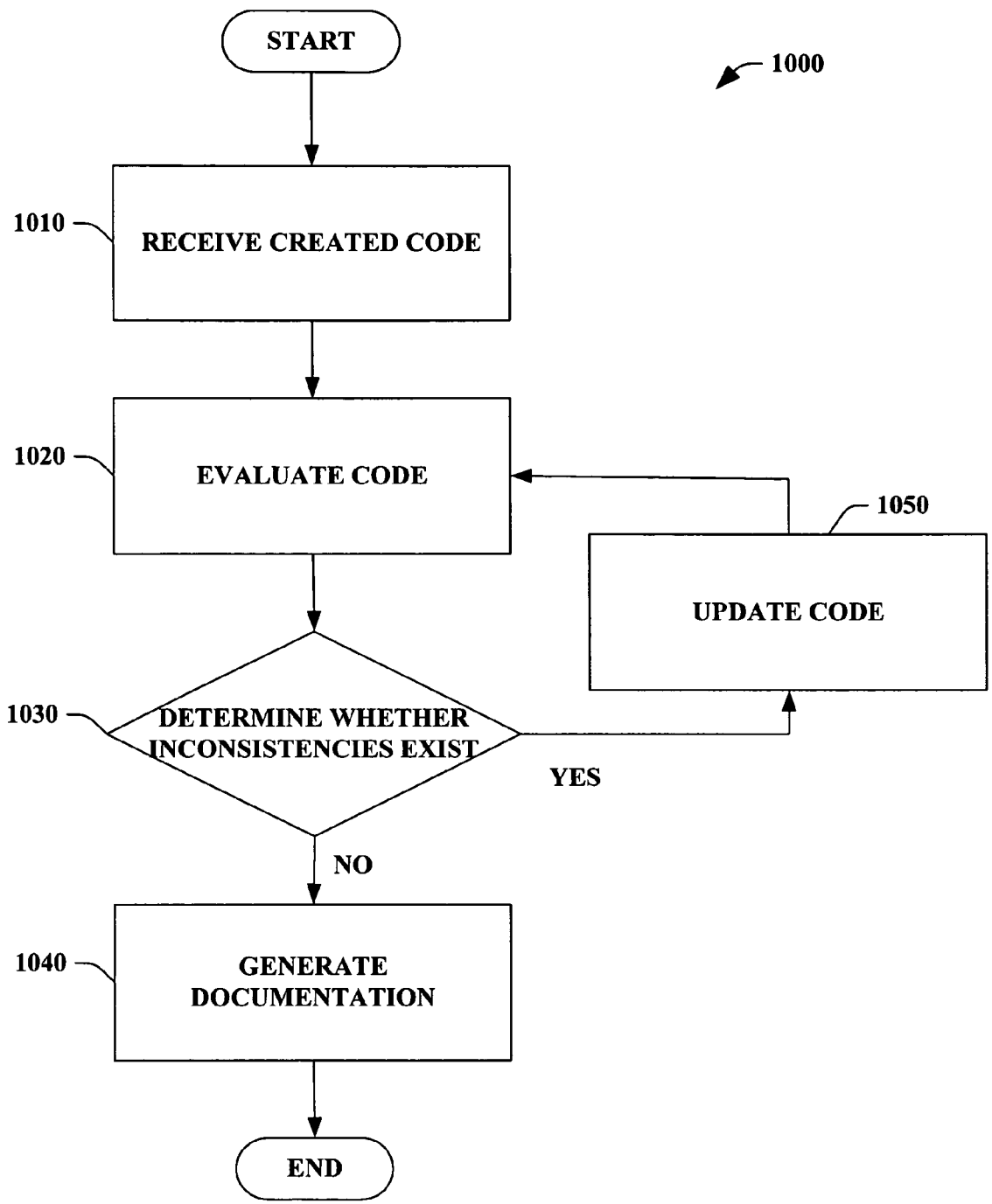
FIG. 10 illustrates a flow chart of an exemplary methodology that facilitates generating documentation dynamically in accordance with an aspect of the subject invention.

FIGS. 8-10 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates generating documentation according to an aspect of the subject invention. At 810, an input is received. The input can be, for example, source code, object code, a binary instruction set, a file system, a text file, etc., and/or a path thereto. At 820, the input is evaluated. The input can be evaluated utilizing static code analysis and/or runtime analysis. Additionally, the entire input or a portion of the input related to a particular aspect (e.g., security, error handling, ... ) can be evaluated. According to an example, static code analysis can be utilized to evaluate source code; more particularly, certain calls and/or attributes associated with the calls can be identified. Pursuant to another example, the file system can be analyzed during runtime for a program to determine whether and/or when the file system is utilized. At 830, documentation can be generated based on the evaluation of the input. The documentation can be, for example, text, images, diagrams, code, outlines, revision marks (e.g., approvable documentation), supplemental documentation, etc. By way of illustration, required permissions identified during evaluation can be included in the generated documentation.

FIG. 9 illustrates a methodology 900 that facilitates supplementing and/or editing documentation according to an aspect of the subject invention. At 910, input such as, for example, existing documentation, source code, object code, binary instruction set(s), file systems, text files, etc., a path to an input, and/or a combination thereof is received. The input is evaluated at 920 by employing static code analysis and/or runtime analysis. Based at least in part upon the evaluation, approvable documentation is generated at 930. According to an example, the approvable documentation can be documentation that includes revision marks. At 940, the approvable documentation is edited and/or accepted to create supplemental documentation. The approvable documentation can be accepted automatically, utilizing an inference associated with machine learning, and/or based on user input (e.g., utilizing a text editor, ... ). Additionally, the approvable documentation can be edited to alter the formatting, content, etc. of the generated documentation. At 950, the supplemental documentation is merged with existing documentation to produce an updated version of the documentation.

FIG. 10 illustrates a methodology 1000 that dynamically generates documentation according to an aspect of the subject invention. At 1010, code created by a programmer or developer is received concurrently while the programmer or developer is creating the code. The code is evaluated at 1020 to identify various characteristics associated with the code as the code is created. The code can be evaluated, for example, via employing static code analysis and/or runtime analysis. At 1030, a determination is made as to whether there are inconsistencies within the code. For example, it can be determined whether certain attributes are incorrect. If no inconsistencies are found, then the documentation is generated at 1040. However, if inconsistencies are identified, then the code is updated at 1050 to remove the inconsistencies and the method 1000 returns to 1020 to further evaluate the code.

Figure 11:
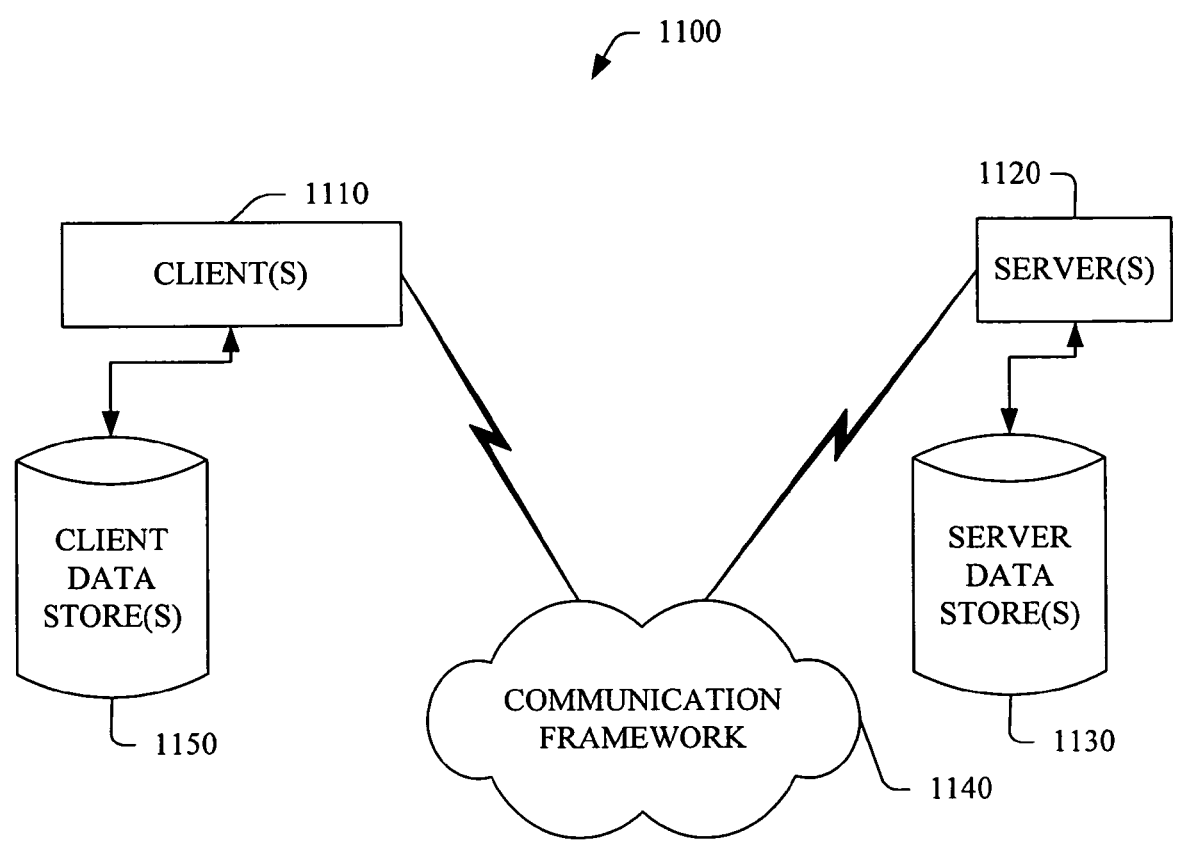
FIG. 11 illustrates an exemplary networking environment, wherein the novel aspects of the subject invention can be employed.
Figure 12:
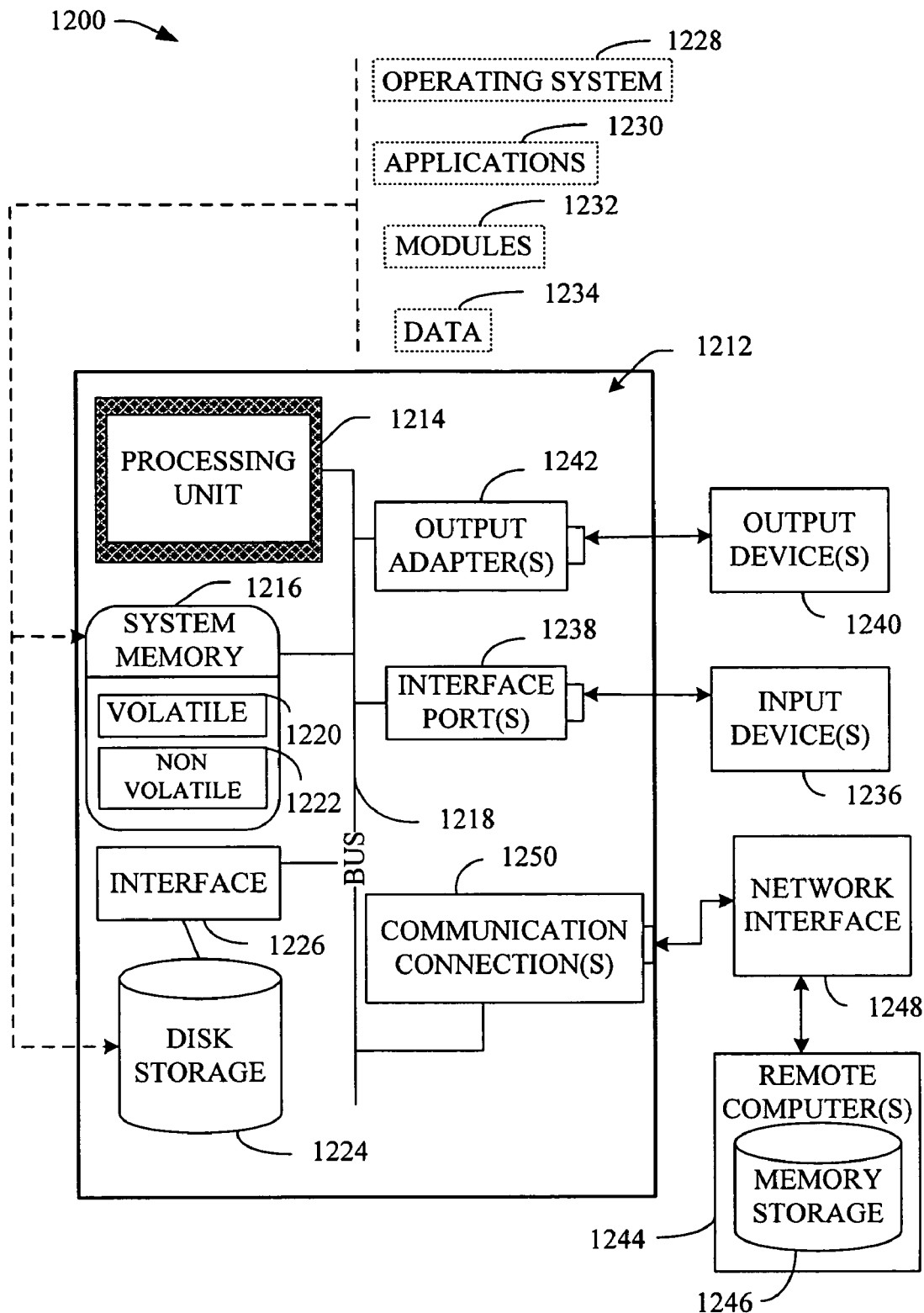
FIG. 12 illustrates an exemplary operating environment, wherein the novel aspects of the subject invention can be employed.

In order to provide additional context for implementing various aspects of the subject invention, FIGS. 11-12 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1120.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), FIREWIRE™ (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), SYNCHLINK DRAM (SLDRAM), and direct RAMBUS RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, JAZ™ drive, ZIP™ drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. documentation generation system, comprising:
 a computer-readable storage medium storing,
  an input component that receives existing documentation, an indication of one or more identified subject areas for which supplemental documentation is to be generated, the one or more identified subject areas including at least one of security, error handling, permissions, and exceptions and software comprised of at least one of source code, object code, and a binary instruction set;
  a documentation generator that utilizes a code analyzer comprised of at least one of static code analysis and runtime analysis to identify those portions of the software that include at least one of the one or more identified subject areas by identifying functions and source code attributes related to the at least one of the one or more identified subject areas, wherein the documentation generator is configured to dynamically generate supplemental documentation at runtime for the identified portions of the software as the software is being analyzed and wherein the documentation generator is further configured to dynamically update the generated supplemental documentation upon detecting that a predetermined threshold amount of the software has been altered; and
  a merge component that integrates the supplemental documentation with the existing documentation, wherein the identified portions of the software are not based upon information annotated by a programmer to accompany software but derived from functionality of the software.

2. The documentation generation system of claim 1, the documentation generator produces documentation associated with error handling during runtime analysis.

3. The documentation generation system of claim 1, the documentation generator utilizes static code analysis to generate documentation based on attributes associated with the source code, wherein static code analysis automatically identifies sections of code pertinent to understanding code structure.

4. The documentation generation system of claim 1, the documentation generator employs static code analysis to identify a particular call to create a file within the source code.

5. The documentation generation system of claim 4, the documentation generator automatically populates the supplemental documentation with boilerplate associated with the identified particular call and signatures.

6. The documentation generation system of claim 1, the documentation generator employs runtime analysis to identify whether a file system is manipulated in connection with executing at least one of the object code and the binary instruction set.

7. The documentation generation system of claim 1, the input component obtains a path to at least one of source code, object code, the binary instruction set, and existing documentation.

8. The documentation generation system of claim 7, further comprising accessing a path comprising a network link to an existing document and merging by inserting a hyperlink directed to the supplemental documentation into the existing documentation.

9. The documentation generation system of claim 1, further comprising an editor that is utilized to accept the supplemental documentation.

10. The documentation generation system of claim 1, the supplemental documentation is at least one of an image, a diagram, code, an outline, a video, an audio, a chart, and a revision mark.

11. The documentation generation system of claim 1, the existing documentation is documentation previously automatically produced via the documentation generator of a prior version of at least one of a source code, object code, and binary instruction set.

12. The documentation generation system of claim 1, wherein the input component receives source code and the documentation generator utilizes static code analysis to evaluate and outline flow of control statements.

13. The documentation generation system of claim 1, wherein the input component receives source code and the documentation generator utilizes static code analysis to identify a call to create files.

14. The documentation generation system of claim 1, the documentation generator produces documentation associated with security handling.

15. The documentation generation system of claim 1, the documentation generator employs static code analysis to identify a particular signature within the source code, wherein the at least one of source code, object code, and binary instruction set is dependent upon at least one of a programming language or computing platform associated with the particular signature to identify particular actions, calls, or methods.

16. A method that facilitates generating documentation, comprising:

employing a processor to facilitate generating documentation by,
receiving existing documentation, an indication of one or more identified subject areas for which supplemental documentation is to be generated, the one or more identified subject areas including at least one of security, error handling, permissions, and exceptions and software comprised of at least one of source code, object code, and a binary instruction set;
identifying those portions of the software that include at least one of the one or more identified subject areas by identifying functions and source code attributes related to the at least one of the one or more identified subject areas utilizing a code analyzer comprised of at least one of static code analysis and runtime analysis;
dynamically generating supplemental documentation at runtime for the identified portions of the software as the software is being analyzed, wherein the dynamic documentation generation is further configured to dynamically update the generated supplemental documentation upon detecting that a predetermined threshold amount of the software has been altered; and
merging the supplemental documentation with the existing documentation, wherein the identified portions of the software are not based upon information annotated by a programmer to accompany software but derived from functionality of the software.

17. The method of claim 16, wherein the supplemental documentation is presented as approvable documentation that is either approvable or not approvable by a user, such that upon approval, the supplemental documentation is added to the existing documentation and upon disapproval, the supplemental documentation is not added to the existing documentation.

18. The method of claim 17, further comprising accepting the approvable documentation to create supplemental documentation.

19. The method of claim 16, further comprising merging the supplemental documentation with existing documentation pertaining to a prior version of at least one of a source code, object code, and binary instruction set.

20. The method of claim 19, further comprising evaluating the at least one of source code, object code, and binary instruction set utilizing both static code analysis and runtime analysis to evaluate and outline flow of control statements, to identify a particular call to create a file, to evaluate security handling, and to evaluate coding errors.

21. The method of claim 16, the existing documentation is generated concurrently with user programming of the source code and the supplemental documentation is subsequently generated from the user programmed source code.

22. The method of claim 16, utilizing static code analysis further comprises searching through the source code and identifying at least one of a call and a signature.

23. The method of claim 16, further comprising evaluating the at least one of source code, object code, and binary instruction set utilizing static code analysis that automatically identifies sections of code pertinent to understanding code structure without benefit of programmer manually input annotations to source code, object code or binary instruction set.

24. A computer-implemented system that facilitates generating documentation, comprising:
a computer-readable storage medium storing,
means for receiving existing documentation, an indication of one or more identified subject areas for which supplemental documentation is to be generated, the one or more identified subject areas including at least one of security, error handling, permissions, and exceptions and software comprised of at least one of source code, object code, and a binary instruction set;

means for analyzing coding aspects of at least one of source code, object code, and a binary instruction set to identify those portions of the software that include at least one of the one or more identified subject areas by identifying functions and source code attributes related to the at least one of the one or more identified subject areas;

means for dynamically generating supplemental documentation at runtime that comprises identified portions of the software as the software is being analyzed, wherein the means for dynamically generating supplemental documentation is further configured to dynamically update the generated supplemental documentation upon detecting that a predetermined threshold amount of the software has been altered; and means for merging the supplemental documentation with the existing documentation, wherein the identified portions of the software are not based upon information annotated by a programmer to accompany software but derived from functionality of the software.

25. The computer-implemented system of claim 24, the means for analyzing employs static code analysis.

26. The computer-implemented system of claim 24, the means for analyzing utilizes runtime analysis pertaining to file access.

* * * * *